US012809108B2

(12) United States Patent
Wu

(10) Patent No.: US 12,809,108 B2
(45) Date of Patent: Nov. 24, 2026

(54) FIBER OPTIC CABLE ASSEMBLY INCORPORATING RIGID SLEEVE, AND METHOD FOR SPLICING MULTIPLE OPTICAL FIBERS

(71) Applicant: CORNING RESEARCH & DEVELOPMENT CORPORATION, Corning, NY (US)

(72) Inventor: Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 308 days.

(21) Appl. No.: 18/762,444

(22) Filed: Jul. 2, 2024

(65) Prior Publication Data

US 2026/0009961 A1 Jan. 8, 2026

(51) Int. Cl.
*G02B 6/44* (2006.01)
*G02B 6/255* (2006.01)

(52) U.S. Cl.
CPC ........... *G02B 6/448* (2013.01); *G02B 6/2558* (2013.01)

(58) Field of Classification Search
CPC ..... G02B 6/255; G02B 6/2555; G02B 6/2558
See application file for complete search history.

(56) References Cited

U.S. PATENT DOCUMENTS

2015/0346445 A1* 12/2015 Blazer .................. G02B 6/4403 385/114
2018/0074261 A1* 3/2018 Burek ...................... G02B 6/25
2021/0157082 A1* 5/2021 Wu .................... G02B 6/02395
2022/0350081 A1* 11/2022 Wu .................... G02B 6/02395
2026/0009961 A1* 1/2026 Wu ........................ G02B 6/448
2026/0118617 A1* 4/2026 Wu .......................... G02B 6/06

OTHER PUBLICATIONS

Griffioen et al., “Preferrulized cables for blowing to homes through 4/3 mm microducts”, 56th IWCS Conference—Proceedings of the International Wire and Cable Symposium, Inc., IWCS 2007, pp. 217-224.

Peter Lo Curzio et al., “3 mm Microduct System for FTTH Networks in MDUs”, Proceedings of the 61st IWCS Conference, 2012, pp. 527, 10 pages.

* cited by examiner

*Primary Examiner* — Rhonda S Peace
(74) *Attorney, Agent, or Firm* — Kapil U. Banakar

(57) ABSTRACT

Perimeter external surfaces of arrays of hard polymer coated optical fibers with precise concentricity are used as datum surfaces for aligning (with an inter-core misalignment tolerance of less than 1 μm) mechanically spliced optical fiber arrays received within a rectangular bore of a rigid sleeve that is devoid of fiber alignment grooves. A method for splicing arrays hard polymer coated optical fibers involves forming ribbonized segments of the arrayed optical fibers, and receiving non-ribbonized segments of the arrays in contact with one another and with walls defining a rectangular cross-section bore of a rigid sleeve. A rigid sleeve for mechanically splicing arrayed optical fibers includes a unitary body structure having a medial portion with a rectangular cross-section bore arranged between first and second extension portions each having a U-shaped channel, with continuous bottom and side walls between the medial and extension portions, and with the sleeve being devoid of fiber alignment grooves.

25 Claims, 9 Drawing Sheets

FIBER OPTIC CABLE ASSEMBLY INCORPORATING RIGID SLEEVE, AND METHOD FOR SPLICING MULTIPLE OPTICAL FIBERS

BACKGROUND

This disclosure relates generally to optical fibers, and more particularly to fiber optic cable assemblies incorporating arrays of optical fibers, and methods for splicing multiple optical fibers.

Optical fibers are useful in a wide variety of applications, including the telecommunications industry for voice, video, and data transmission. An exemplary coated optical includes a glass core, glass cladding surrounding the glass core, and a polymer coating (optionally including multiple coating layers) surrounding the glass cladding. An outer diameter of a coated optical fiber may be about 200 μm, about 250 μm, or any other suitable value, while a core diameter of a single-mode optical fiber may be on the order of 8 μm to 10 μm, and a core diameter of a multi-mode optical fiber may be somewhat larger. An additional covering, which may be embodied in a tight buffer layer or a loose tube (also known as a furcation tube or fanout tube), may be applied to one or more coated optical fibers to provide additional protection and allow for easier handling.

In a telecommunications system that uses optical fibers, there are frequently instances when need arises to connect optical fibers to one another for transmission of optical signals therebetween, whether through use of prefabricated fiber optic connectors or by splicing. Splicing may involve either mechanical splicing or fusion splicing. Fusion splicing utilizes heat (e.g., generated by an electric arc or other means) to fuse (e.g., melt) aligned ends of optical fibers to one another, and requires use of a fusion splicing machine. Mechanical splicing involves alignment devices that do not permanently join optical fiber ends to one another, but hold optical fiber ends proximate to one another in a precisely aligned manner sufficient to permit optical signals to pass from one optical fiber to another.

Multi-fiber mechanical splicing has been developed as a rapid and low-cost alternative to mass fusion splicing. Typically, multiple fibers arranged in a one-dimensional array are aligned by mechanical features such as V-grooves or microtubes arranged on a splicing substrate. An example of a multi-fiber mechanical splicing apparatus 10 is shown in FIG. 1. As shown, a substrate 20 includes a lower surface 22 and an opposing an upper surface 21 with a central portion 24 defining twelve V-grooves 25 extending between peripheral recesses 26A-26B. A first one-dimensional array of optical fibers 30A includes a first coated segment 31A (e.g., coated with a relatively soft polymer material) and a first stripped segment 32A with first bare fiber ends 34A, and a second one-dimensional array of optical fibers 30B includes a second coated segment 31B and a second stripped segment 32B with second bare fiber ends 34G. The V-grooves 25 are arranged to receive optical fibers of the first and second stripped segments 32A, 32B in a precisely aligned manner, with the first bare fiber ends 34A abutting the second bare fiber ends 34B to form mechanical splices therebetween. The V-grooves 25 serve to align and laterally space the stripped segments 32A, 32 of optical fibers. Portions of the first and second coated segments 31A, 31B may be received in respective peripheral recesses 26A, 26B of the substrate 20, and a cover member 28 is arranged to be received by the substrate 20 (with a lower surface 29 of the cover 28 contacting the upper surface 21 of the substrate 20) to cover the stripped segments 32A, 32B of the first and second one-dimensional arrays of optical fibers 30A, 30B. If a greater amount of splices are needed, the multiple splice substrates 20 such as shown in FIG. 1 are typically stacked together.

Although the array-type multi-fiber mechanical splicing apparatuses such as shown in FIG. 1 achieve higher density than single-fiber or dual-fiber splicing apparatuses, demand exists for even higher density multi-fiber mechanical splicing apparatuses. New fiber applications require high fiber density and high fiber count. In a growing number of cable installations, cables are blown through microducts using high pressure air. There is an increasing interest (particularly in indoor applications) in reducing the diameter of microducts, with the smallest conventional microducts having an outer diameter of 3 millimeters and an inner diameter of 2 millimeters. The limited fiber splice density provided by existing array-type multi-fiber mechanical splicing apparatuses limit the ability to convey mechanically spliced multi-fiber cable assemblies through microducts and other volumetrically constrained conduits.

Need exists in the art for multi-fiber mechanical splicing apparatuses (and fiber optic cable assemblies incorporating the same) suitable for connecting larger numbers of optical fibers at a higher spatial density than conventional multi-fiber mechanical splicing apparatuses, and methods for mechanically splicing large numbers of optical fibers.

SUMMARY

The present disclosure includes fiber optic cable assemblies having arrays of hard polymer coated glass optical fibers with non-ribbonized segments thereof being received within a bore of a rigid sleeve that is devoid of fiber alignment grooves to provide mechanical splicing utility, with the hard polymer coating of each optical fiber having a concentricity relative to the fiber core ranging between 0.1 μm and 0.5 μm, and with the bore of the rigid sleeve being dimensioned to promote a misalignment tolerance of less than 1 μm between fiber cores at abutting proximal ends of the optical fibers. The hard polymer coating has a thickness between 0.1 μm and 10 μm, and a Shore D hardness greater than 60. The precise concentricity and low compliance (i.e., hardness) of the hard polymer coating permits exterior surfaces of the optical fibers themselves, when arranged in a close-packed array against walls defining the sleeve bore, to embody datum features to promote fiber alignment at abutting fiber ends. Ribbonized segments of the hard polymer coated optical fibers are arranged outside the sleeve bore. A method for splicing arrays hard polymer coated optical fibers includes ribbonizing a section of each array of hard polymer coated optical fibers to form first and second ribbonized segments, receiving non-ribbonized segments of the first and second arrays of hard polymer coated optical fibers in contact with walls defining a rectangular cross-section bore of a rigid sleeve and with the hard polymer coatings of adjacent optical fibers in contact with one another, with the bore being dimensioned to provide an alignment tolerance of less than 1 μm between fiber cores at abutting proximal ends of the arrays of optical fibers. A rigid sleeve for splicing optical fibers of a fiber optic cable assembly is also provided, with the rigid sleeve comprising a unitary body structure having a medial portion defining a rectangular cross-section bore being arranged between first and second extension portions each defining a generally U-shaped channel, with bottom walls and side walls of the medial portion and extension portions being continuous and being devoid of any fiber alignment grooves.

One aspect of the disclosure relates to a fiber optic cable assembly comprising a first plurality of optical fibers and a second plurality of optical fibers, and a rigid sleeve defining a bore having a rectangular cross section. Optical fibers of each of the first plurality of optical fibers and the second plurality of optical fibers includes a glass optical fiber and a hard polymer coating surrounding the glass optical fiber, the glass optical fiber comprising a fiber core and a cladding surrounding the fiber core, with the hard polymer coating having a thickness between 0.1 μm and 10 μm, a Shore D hardness greater than 60, and a concentricity relative to the fiber core ranging between 0.1 μm and 0.5 μm. The first plurality of optical fibers comprises a first ribbonized segment and first non-ribbonized segment, with the first non-ribbonized segment including proximal ends of optical fibers of the first plurality of optical fibers. The second plurality of optical fibers comprises a second ribbonized segment and at least one second non-ribbonized segment, with the second ribbonized segment including proximal ends of optical fibers of the second plurality of optical fibers. The bore of the rigid sleeve is configured to receive the first non-ribbonized segment and the second non-ribbonized segment with proximal ends of the first plurality of optical fibers abutting proximal ends of the second plurality of optical fibers within the bore, the bore being bounded by walls that are devoid of fiber alignment grooves, the walls being configured to contact (i) the hard polymer coating of at least some optical fibers of the first plurality of optical fibers and (ii) the hard polymer coating of at least some optical fibers of the second plurality of optical fibers, and the bore being dimensioned to promote a misalignment tolerance of less than 1 μm between fiber cores at abutting proximal ends of the first and second pluralities of optical fibers.

Another aspect of the disclosure relates to a method for splicing optical fibers, including providing a first plurality of optical fibers and a second plurality of optical fibers, wherein optical fibers of each of the first plurality of optical fibers and the second plurality of optical fibers includes a glass optical fiber and a hard polymer coating surrounding the glass optical fiber, and the glass optical fiber comprises a fiber core and a cladding surrounding the fiber core, with the hard polymer coating having a thickness between 0.1 μm and 10 μm, a Shore D hardness greater than 60, and a concentricity relative to the fiber core ranging between 0.1 μm and 0.5 μm. The method further comprises ribbonizing a section of the first plurality of optical fibers to provide a first ribbonized segment, wherein the first plurality of optical fibers further comprises a non-ribbonized segment including proximal ends of the first plurality of optical fibers; and ribbonizing a section of the second plurality of optical fibers to provide a second ribbonized segment, wherein the second plurality of optical fibers further comprises a non-ribbonized segment including proximal ends of the second plurality of optical fibers. The method additionally comprises receiving the first non-ribbonized segment and the second non-ribbonized segment in a bore of a rigid sleeve with proximal ends of the first plurality of optical fibers abutting proximal ends of the second plurality of optical fibers, the bore having a rectangular cross-section and being bounded by walls that are devoid of fiber alignment grooves, with the walls contacting (i) the hard polymer coating of at least some optical fibers of the first plurality of optical fibers and (ii) the hard polymer coating of at least some optical fibers of the second plurality of optical fibers, and the bore being dimensioned to provide an alignment tolerance of less than 1 μm between fiber cores at abutting proximal ends of the first and second pluralities of optical fibers.

Another aspect of the disclosure relates to rigid sleeve for splicing optical fibers of a fiber optic cable assembly, the rigid sleeve comprising a unitary body structure comprising a medial portion arranged between first and second extension portions. The medial portion defines a bore having a rectangular cross-section, the walls bounding the bore being bounded by a plurality of walls including a bottom wall, a top wall, and two opposing side wall, wherein each of the first extension portion and the second extension portion defines a generally U-shaped channel, the channel being bounded by a bottom wall and two opposing side walls. The bottom wall of the medial portion extends continuously from the bottom wall of the first extension portion to the bottom wall of the second extension portion, and the side walls of the medial portion extend continuously from the side walls of the first extension portion to the side walls of the second extension portion, to form a continuous passage between the bore and the channel defined in the first and second extension portions, wherein each bottom wall, each side wall, and the top wall is devoid of fiber alignment grooves.

In another aspect, any two or more features described in connection with the foregoing aspects and/or other embodiments disclosed herein may be combined for additional advantage.

Additional features and advantages will be set out in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
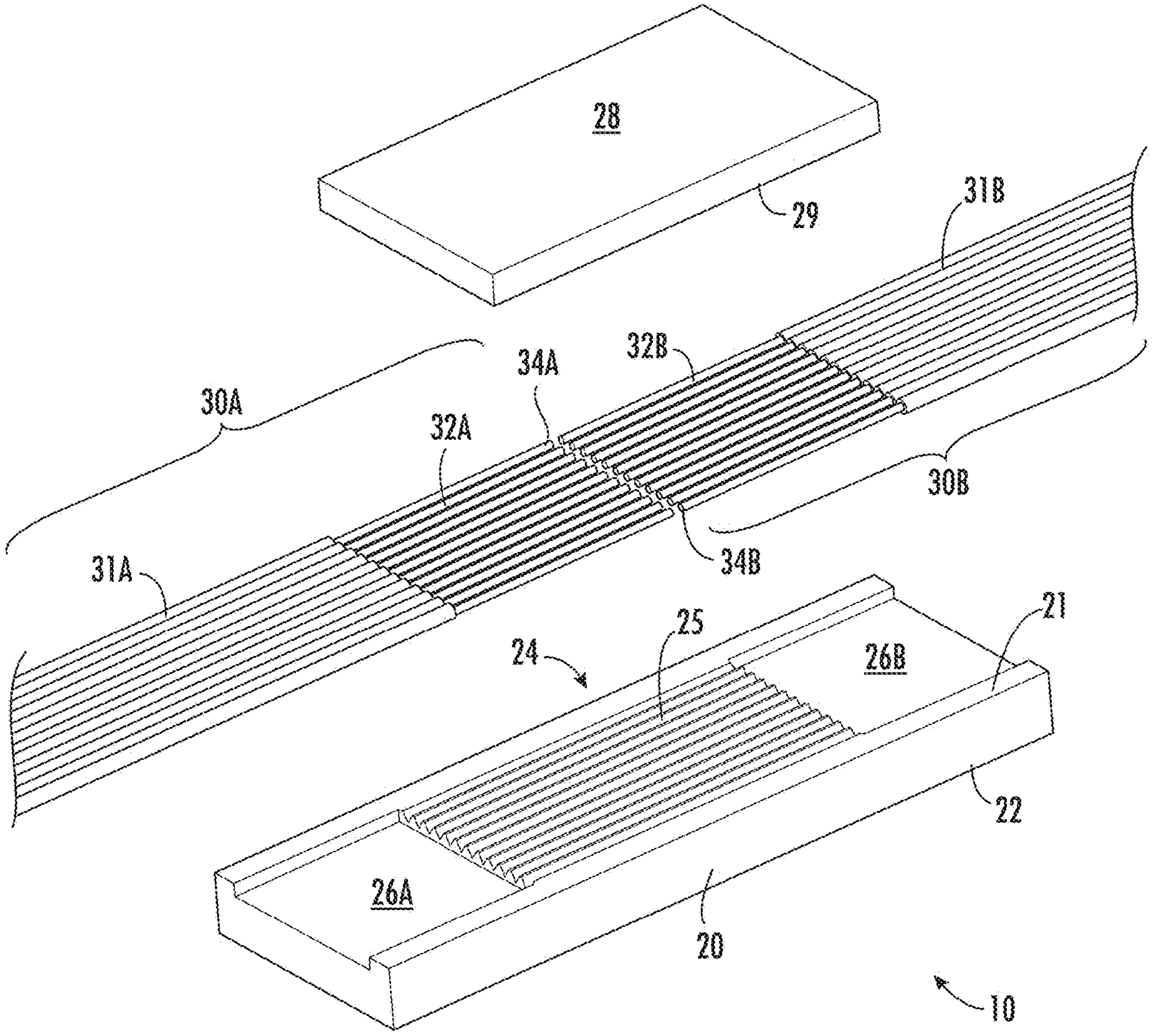
FIG. 1 (PRIOR ART)
FIG. 1 is an exploded perspective view of a conventional multi-fiber mechanical splicing apparatus including a substrate defining twelve V-grooves for receiving and aligning ends of first and second pluralities of fibers arranged in a one-dimensional array.

Various embodiments will be further clarified by examples in the description below. In general, the description relates to fiber optic cable assemblies having two-dimensional arrays of hard polymer coated glass optical fibers with non-ribbonized segments thereof being received within a bore of a rigid sleeve that is devoid of fiber alignment grooves to provide mechanical splicing utility, with the hard polymer coating of each optical fiber having a concentricity relative to the fiber core ranging between 0.1 μm and 0.5 μm, and with the bore of the rigid sleeve being dimensioned to promote a misalignment tolerance of less than 1 μm between fiber cores at abutting proximal ends of the optical fibers. The hard polymer coating has a thickness between 0.1 μm and 10 μm, and a Shore D hardness greater than 60. The precise concentricity and low compliance of the hard polymer coating permits exterior surfaces of the optical fibers themselves, when arranged in a close-packed array against walls defining the sleeve bore, to embody datum features to promote fiber alignment at abutting fiber ends. Ribbonized segments of the fiber arrays are arranged outside the sleeve bore. A method for splicing arrays hard polymer coated optical fibers includes ribbonizing a section of each array of hard polymer coated optical fibers to form first and second ribbonized segments, and receiving non-ribbonized segments of the first and second arrays of hard polymer coated optical fibers in contact with walls defining a rectangular cross-section bore of a rigid sleeve and with the hard polymer coatings of adjacent optical fibers in contact with one another, with the bore being dimensioned to provide an alignment tolerance of less than 1 μm between fiber cores at abutting proximal ends of the arrays of optical fibers. A rigid sleeve for splicing optical fibers of a fiber optic cable assembly is also provided, with the rigid sleeve comprising a unitary body structure having a medial portion defining a rectangular cross-section bore being arranged between first and second extension portions each defining a generally U-shaped channel, with bottom walls and side walls of the medial portion and extension portions being continuous and being devoid of any fiber alignment grooves.

Although glass fibers typically have precise cladding-to-core concentricity and precise outer dimensions (i.e., along outer cladding surfaces), it has been impractical to place glass surfaces of optical fibers in direct lateral contact in a packed array (particularly for cable assemblies fabricated in-field, rather than in a controlled factory environment), due to concerns such as mechanical abrasion, binding, and/or fracturing. Provision of a hard polymer coating on optical fibers as used herein, precise concentricity and low compliance, mitigates the foregoing concerns and permits exterior surfaces of the hard polymer coated fibers to be arranged in a close-packed array against walls defining a sleeve bore, and embody datum features to promote fiber alignment at abutting fiber ends.

Further details regarding the subject matter of the disclosure are provided hereinafter, after introduction to terminology used in the application.

Reference Numbers and Terminology

The use herein of ordinals in conjunction with an element is solely for distinguishing what might otherwise be similar or identical labels, such as "first" and "second," and does not imply a priority, a type, an importance, or other attribute, unless otherwise stated herein.

The term "about" as used herein in conjunction with a numeric value means any value that is within a range of ten percent greater than or ten percent less than the numeric value.

The term "substantially" used herein in conjunction with a geometric property or characteristic (e.g., "substantially flush") includes slight deviations from the geometric property/characteristic in question due to manufacturing limitations and tolerances.

In this disclosure, when numerical ranges are discussed (e.g., "X to Y" or "between X and Y", with X and Y being integers), the ranges include the stated end points.

As used herein, the articles "a" and "an" in reference to an element refers to "one or more" of the element unless otherwise explicitly specified. The word "or" as used herein is inclusive unless contextually impossible. As an example, the recitation of A or B means A, or B, or both A and B.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In this disclosure, the term "optical fiber" (or "fiber") is used in a generic sense and may encompass bare optical fibers, coated optical fibers, or buffered optical fibers, as well as optical fibers including different sections corresponding to these fiber types, unless it is clear from the context which of the types is intended. An "optical fiber" refers to a waveguide having a glass portion surrounded by a coating. The glass portion includes a core and a cladding and is referred to herein as a "glass fiber." "Bare optical fibers" (including "bare glass optical fibers") or "bare sections" are those with no coating present on the fiber cladding. "Coated optical fibers" or "coated sections" include a single or multi-layer polymeric coating (typically acrylic) material surrounding the fiber cladding and have a nominal (i.e., stated) diameter no greater than twice the nominal diameter of the bare optical fiber. In certain embodiments, an optical fiber having a glass core as disclosed herein may be configured to carry (e.g., conduct) optical signals in a wavelength range of 850 nm to 1550 nm. Optical fibers herein may encompass single-mode and multi-mode varieties.

The term "stripped" as used herein (e.g., in the context of a "stripped region") in connection with a glass optical fiber refers to an optical fiber for which any (and all) polymer coating layers have been removed. In certain embodiments, a stripped glass optical fiber may include an enhanced hardness outer surface having a hardness greater than a remaining (internal) portion of the glass cladding material, wherein such an enhanced hardness outer surface may be modified by physical means and/or chemical means (e.g., ion exchange), or may include a precision thickness layer of an enhanced hardness (e.g., ceramic) material.

This disclosure also refers to optical fibers having various "regions," such as "stripped regions" or "stripped regions." It will be clear from the context that, in some instances, a region of an optical fiber segment may be coextensive with the length of the optical fiber segment. For example, in some instances it will be clear that an optical fiber segment comprising a "stripped region" does not necessarily mean that there is some other, adjacent unstripped region; this is not the case unless the context makes clear otherwise.

"Concentricity" (or "concentricity error") is defined as the distance between the geometric centers of two shapes/profiles, where one of the shapes surrounds the other shape. The shapes/profiles may be defined by different elements, such as the outer surface of a polymer coating and the outer surface of a core as discussed in greater detail below. Thus, the concentricity of a polymer coating relative to a core is the distance between a geometric center of the polymer coating and a geometric center of the core.

Groups of coated optical fibers (e.g., at least 4, 8, 12, or 24 optical fibers) may be held together using a matrix material, intermittent inter-fiber binders ("spiderwebs"), or tape to form "optical fiber ribbons" or "ribbonized optical fibers" to facilitate packaging either within cables or outside of cables, with each fiber having a different color for ease of identification.

Preferred Embodiments

Reference will now be made in detail to the presently preferred embodiments, examples of which are illustrated in the following drawings. Whenever feasible, the same or corresponding reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Fiber optic cable assemblies including mechanically spliced arrays of optical fibers, and methods for their fabrication, incorporate arrays of hard polymer coated optical fiber arrays that serve as datum features to promote fiber alignment at abutting fiber ends within a rectangular cross section bore of a rigid sleeve that is devoid of fiber alignment grooves. The hard polymer coating has a thickness between 0.1 μm and 10 μm, a Shore D hardness greater than 60, and a concentricity relative to the fiber core ranging between 0.1 μm and 0.5 μm. The precise concentricity and low compliance (i.e., hardness) of the hard polymer coating permits exterior surfaces of the optical fibers themselves, when arranged in a close-packed array against walls defining the sleeve bore, to embody datum features to promote fiber alignment at abutting fiber ends. This approach leverages the mechanical precision and accuracy of the geometry of hard polymer coated optical fiber to enable formation of high density and high accuracy fiber optic mechanical splicing arrangements. This approach enables tangible benefits, since as provision of highly dense and simple mechanical splicing designs are provided, thereby enabling more input/output per unit cross-sectional area, and permitting multi-fiber mechanical splicing apparatuses to be used in connection with microducts.

Figure 2:
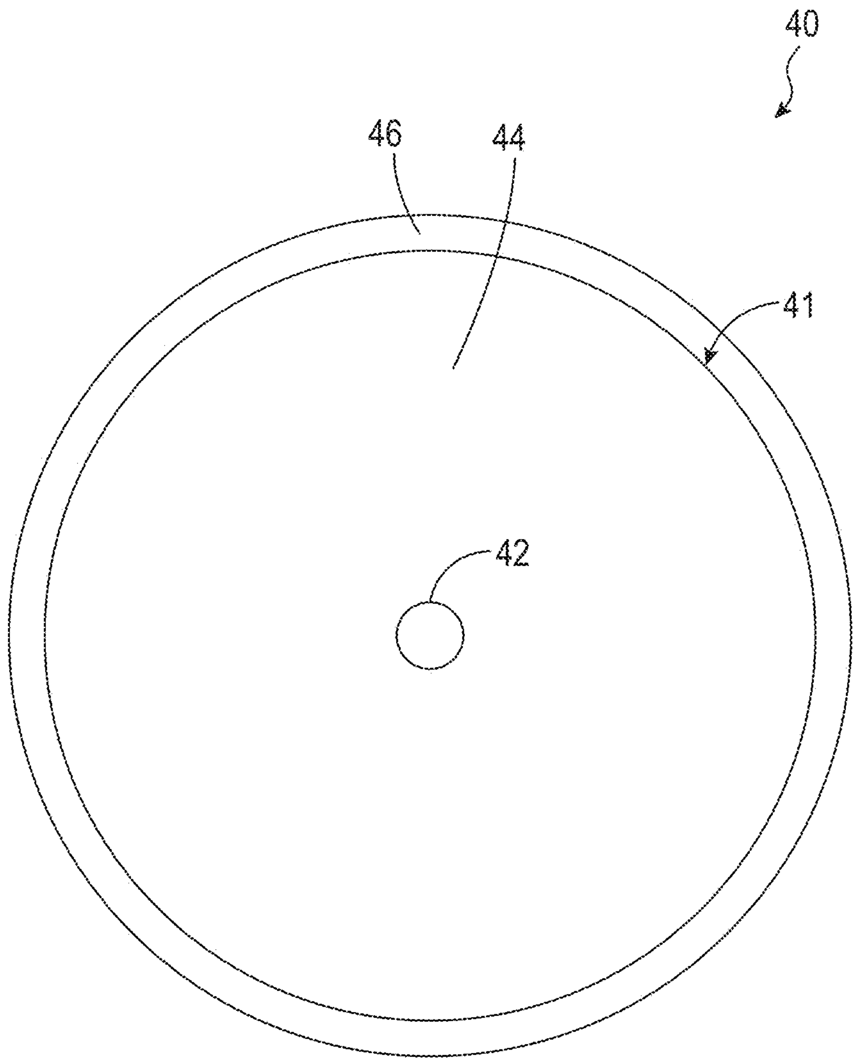
FIG. 2 is a cross-sectional view of an optical fiber with a high modulus polymer coating applied thereto.

A hard polymer coated optical fiber will now be introduced. FIG. 2 is a cross-sectional view of an optical fiber 40 including a glass fiber 41 with a hard polymer coating 46 applied thereto. The glass fiber 41 includes a core 42 and a cladding 43. The core 42 has a higher refractive index than cladding 44, and glass fiber 41 functions as a waveguide. In many applications, core 42 and cladding 44 have a discernible core-cladding boundary. Alternatively, core 42 and cladding 44 can lack a distinct boundary.

The core 42 comprises silica glass, which may be undoped silica glass, undoped silica glass, and/or downdoped silica glass. The radius of the core 42 is in the range from about from about 3.0 microns to about 6.5 microns, or in the range from about 3.5 microns to about 6.0 microns, or in the range from about 4.0 microns to about 6.0 microns, or in the range from about 4.5 microns to about 5.5 microns. In some embodiments, the core 42 includes a portion with a constant or approximately constant relative refractive index that has a width in the radial direction of at least 1.0 micron, or at least 2.0 microns, or at least 3.0 microns, or in the range from 1.0 microns to 3.0 microns, or in the range from 2.0 microns to 3.0 microns.

The cladding 44 is composed of one or more materials with an appropriate refractive index differential to provide desired optical characteristics with the core 42. In embodiments in which core 42 is doped with Ge and/or Cl, the cladding 44 may comprise silica that is substantially free of Ge and/or Cl. In some embodiments, the radius of cladding 44 is in the range from about 8.0 microns to about 16.0 microns, or in the range from about 9.0 microns to about 15.0 microns, or in the range from about 10.0 microns to about 14.0 microns, or in the range from about 10.5 microns to about 13.5 microns, or in the range from about 11.0 microns to about 13.0 microns. The thickness of the cladding 44 is in the range from about 3.0 microns to about 10.0 microns, or from about 4.0 microns to about 9.0 microns, or from about 5.0 microns to about 8.0 microns.

The hard polymer coating 46 is applied onto glass fiber 41 to be in contact with the cladding 44 about a circumference of the optical fiber 40. The hard polymer coating 46 has a substantially consistent thickness (and therefore a substantially consistent outer diameter) along a length of optical fiber 40. In some embodiments, the thickness of the hard polymer coating is in a range of from 20 nm to 20 μm, or in a range of between 0.1 μm and 10 μm. In some embodiments, the thickness of hard polymer coating 46 is between 0.1 μm and 10 μm, 0.1 μm and 5 μm, or 0.1 μm and 2.5 μm about the circumference of optical fiber 100. In some embodiments, the thickness of the hard polymer coating 46 has a standard deviation ranging between 0.1 μm and 0.5 μm, 0.1 μm and 0.3 μm, or 0.1 μm and 0.2 μm. The hard polymer coating 46 is made of various materials including UV-cured acrylates or organic UV-curing acrylate resins filled with $SiO_2$ or $ZrO_2$ nanoparticles or non-acrylate polymers such as polyimides. The hard polymer coating 106 may also include a silane additive to promote bonding to glass or inorganic surfaces. In some embodiments, the silane additive includes acryloxy silanes, methacrylate silanes, or Mercapto silanes, such as (3-Mercaptopropyl) trimethoxysilane and (3-acryloxypropyl) trimethoxysilane.

In some embodiments, the hard polymer coating 46 has an elastic modulus value greater than 0.3 GPa, greater than 1 GPa, or greater than 2.5 GPa. In one embodiment, the polymer coating 106 has an elastic modulus higher than 0.5 GPa or higher than 1 GPa. In another embodiment, the polymer coating 46 has an elastic modulus of about 2.5 GPa. In some embodiments, the polymer coating 46 has a hardness (Shore D) value greater than 60, greater than 70, or greater than 80. In one embodiment, the hard polymer coating 46 has a hardness (Shore D) value of about 95. In some embodiments, the hard polymer coating 46 has a pencil hardness value greater than 3H, greater than 4H, or greater than 5H on Polymethylmethacrylate (PMMA) film. In some embodiments, the hard polymer coating 46 has a thickness between 0.1 μm and 10 μm, a Shore D hardness greater than 60, and a concentricity relative to the fiber core 42 ranging between 0.1 μm and 0.5 μm.

As mentioned previously, the polymer coating 46 is applied onto the glass optical fiber 41. The polymer coating 46 is applied onto the glass optical fiber 41 such that a concentricity of the polymer coating 46 relative to the core 42 is limited to a narrow range. In some embodiments, the concentricity of the polymer coating 46 relative to the core 42 ranges between 0.1 μm and 0.5 μm, 0.1 μm and 0.3 μm, or 0.1 μm and 0.2 μm. In one embodiment, the concentricity of the polymer coating 46 relative to the core 42 is less than about 0.15 μm.

Additional details concerning formation of hard polymer coatings on glass optical fibers are disclosed in U.S. Patent Application Publication No. 2022/0026604 A1 published on Jan. 27, 2022 in the name of Corning Research & Development Corporation, wherein the entire contents of the foregoing publication are hereby incorporated by reference herein.

Having described hard polymer coated optical fibers, fiber optic cable assemblies and multi-fiber mechanical splicing apparatuses will now be described.

In certain embodiments, to prepare for mechanical splicing, segments of first and second arrays of hard polymer coated optical fibers are ribbonized. Ribbonization may utilize matrix material, intermittent inter-fiber binders, or tape. In certain embodiments, a polymeric matrix material (e.g., having an elastic modulus greater than 100 MPa) may be applied in liquid form into a mold (not shown) fitted around arrayed fiber segments, and then solidified (e.g., cured).

Figure 3:
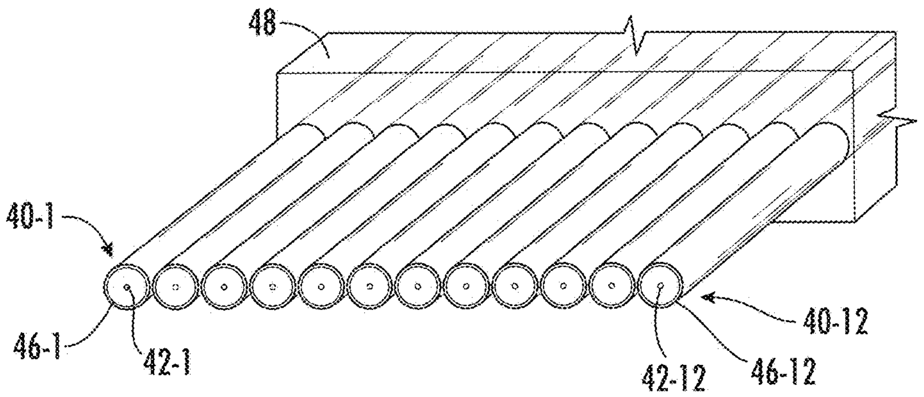
FIG. 3 is a perspective view of a plurality of hard polymer coated optical fibers arranged in a one-dimensional array, including a ribbonized segment having a matrix material encasing the arrayed optical fibers.

FIG. 3 is a perspective view of an array of hard polymer coated optical fibers 40-1 to 40-12 arranged in a one-dimensional array, including a ribbonized segment having a ribbon matrix material 48 encasing the arrayed optical fibers 40-1 to 40-12 with no nominal spacing (i.e., with optical fibers 40-1 to 40-2 laterally contacting one another). Each optical fiber 40-1 to 40-12 includes a hard polymer coating 46-1 to 46-12 that is highly concentric relative to a core 42-1 to 42-12 thereof, as visible along end faces of the optical fibers 40-1 to 40-12. In some embodiments, the optical fibers 40-1 to 40-12 have a precise outer diameter of 125 μm. The ribbon matrix material 48 may have a length of at least 2 mm and a thickness of at least 0.15 mm, and may hold the optical fibers 40-1 to 40-12 in axial position so that, after cleaving, proximal ends of the optical fibers 40-1 to 40-12 (to be mechanically spliced) are coplanar within 10 μm. In certain embodiments, a length of the optical fibers 40-1 to 40-12 projecting beyond the ribbon matrix material 48 may be about 5 mm, whereby lateral positions of the optical fibers 40-1 to 40-12 projecting beyond the ribbon matrix material 48 may deviate by more than 10 μm (which differs from typical fiber array units made by V-groove arrays or squeezed assembly processes). Precise alignment of the optical fibers 40-1 to 40-12 occurs in a rigid sleeve of a mechanical splicing apparatus, such as shown (for example) in FIG. 4A-4C, 8A-8B, or 9A-9B.

Figure 4A:
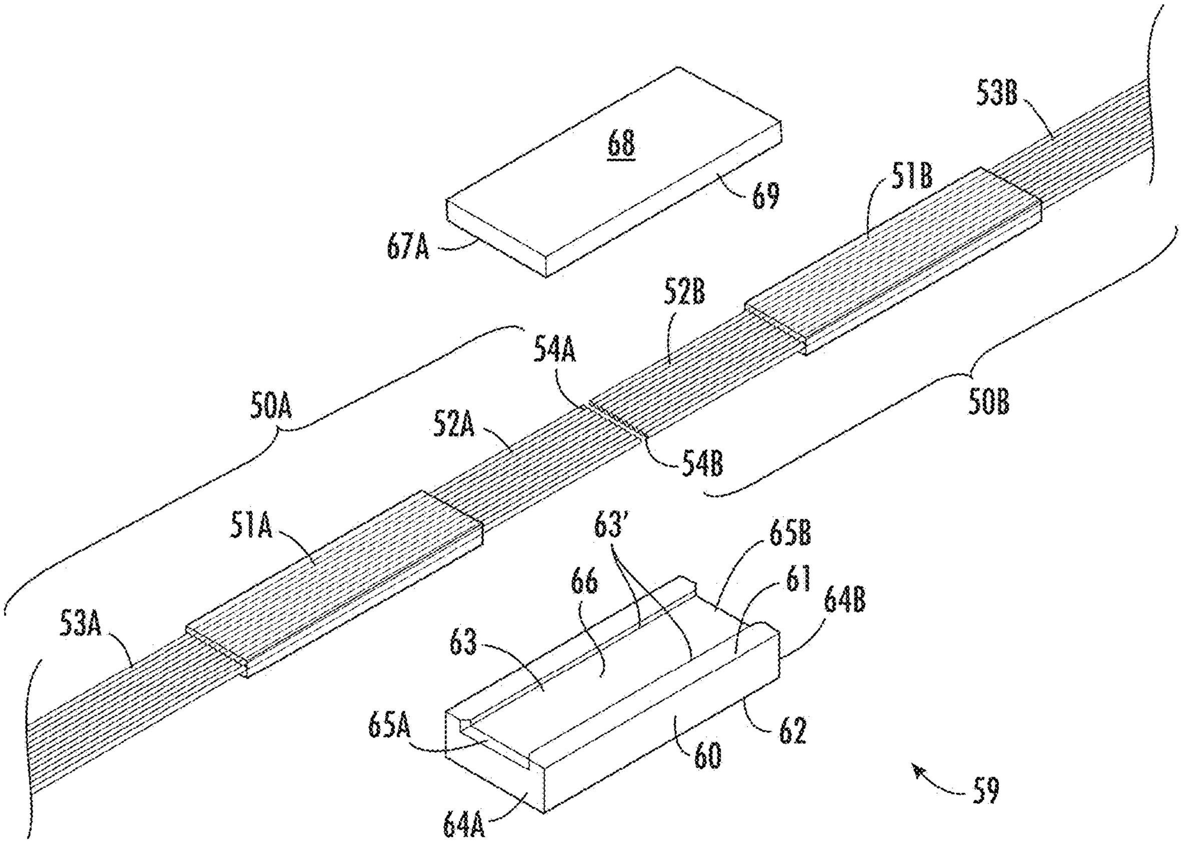
FIG. 4A is an exploded perspective view of a multi-fiber mechanical splicing apparatus as part of a fiber optic cable assembly according to one embodiment of the present disclosure including a two-part rigid sleeve (including a first body structure defining a channel, and a second body structure serving as a cover, together forming a bore) devoid of alignment features but being configured to maintain abutting ends of non-ribbonized segments of first and second one-dimensional arrays of hard polymer coated optical fibers in an aligned relationship with adjacent optical fibers laterally contacting one another.

FIG. 4A is an exploded perspective view of a multi-fiber mechanical splicing apparatus as part of a fiber optic cable assembly 49 according to one embodiment utilizing a two-part rigid sleeve (including a first body structure 60 defining a channel 66, and a second body structure 68 serving as a cover), with the rigid sleeve (60, 66) being devoid of fiber alignment features. A first plurality of hard polymer coated optical fibers 50A arranged in a one-dimensional array includes a first ribbonized segment 51A, a first proximal non-ribbonized segment 52A, and a first distal non-ribbonized segment 53A, wherein proximal ends 54A of the first plurality of optical fibers 50A may be cleaved or polished. A second plurality of hard polymer coated optical fibers 50B arranged in a one-dimensional array includes a second ribbonized segment 51B, a second proximal non-ribbonized segment 52B, and a second distal non-ribbonized segment 53B, wherein proximal ends 54B of the second plurality of optical fibers 50B may be cleaved or polished. As shown, the first proximal non-ribbonized segment 52A and the second proximate non-ribbonized segment 52B are arranged to be received by the channel 66 defined by a bottom wall 63 and side walls 63' the first body structure 60, with proximal ends 54A of the first plurality of optical fibers 50A are arranged very close to proximal ends 54B of the second plurality of optical fibers 50B. The channel 66 is recessed relative to an upper surface 61 of the first body structure 60, with the first body structure 60 further including an opposing lower surface 62. The channel 66 extends between opposing first and second ends 64A, 64B of the first body structure 60, with chamfered edges 65A, 65B being provided at transitions between the ends 64A, 64B and the channel 66. The second body structure 68 includes a lower surface 69 and chamfered edges (e.g., 67A).

Figure 4B:
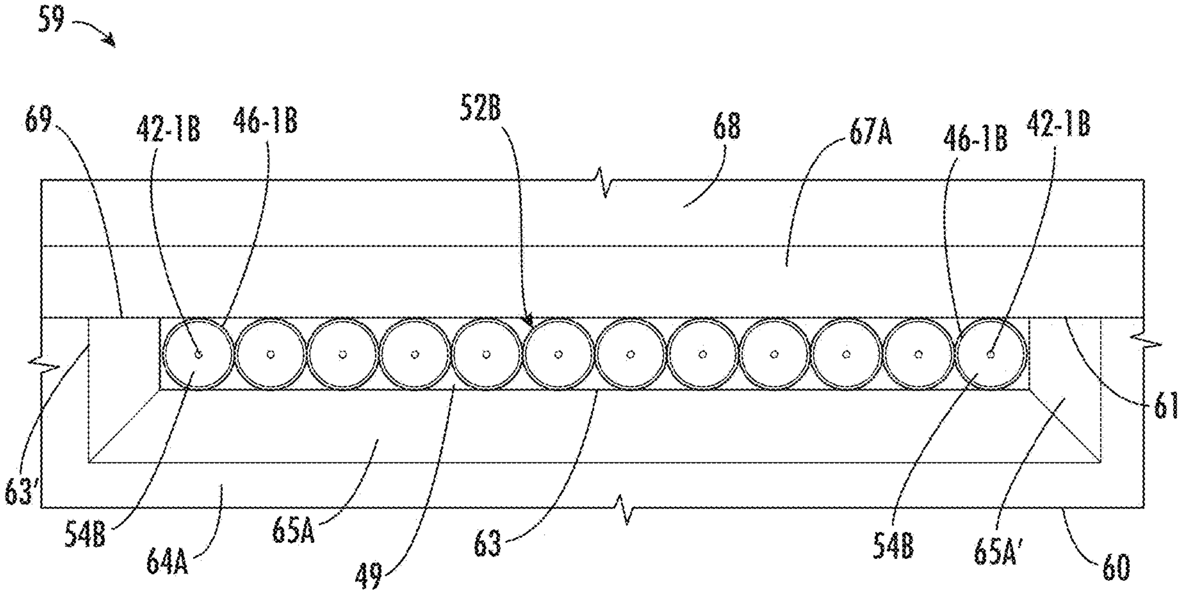
FIG. 4B is an elevational view of the second plurality of optical fibers received within an assembled sleeve of the multi-fiber mechanical splicing apparatus of FIG. 4A.

Precision alignment between the first and second pluralities of hard coated optical fibers 50A, 50B occurs in the rigid sleeve 60, 68, which may be fabricated of rigid materials such as composites, fiber-reinforced polymeric material, glass, ceramic, and/or metal. In certain embodiments, the rigid sleeve 60, 68 may be fabricated by molding. In certain embodiments, materials of fabrication of the rigid sleeve are selected to have coefficient of thermal expansion (CTE) properties that differ from CTE properties of the hard coated optical fibers 50A, 50B by no more than 30%, no more than 20%, no more than 10%, no more than 5%, or no more than 2%. The channel 66 is precisely dimensioned to tightly accommodate the first and second pluralities of hard coated optical fibers 50A, 50B, thus positioning the first and second pluralities of hard coated optical fibers 50A, 50B in a precision pitch defined by the outer dimension of the hard polymer coated optical fibers 50A, 50B. The lower surface 69 of the second body structure (i.e., cover) 68 may be received against upper surface 61 of the first body structure 60 to enclose a bore (49 in FIG. 4B) having a rectangular cross-section. The lower surface 69 of the second body structure, as well as the bottom wall 63 and side walls 63' bounding the channel 66, further contact hard polymer coated optical fibers of the first proximal non-ribbonized segment 52A and the second proximate non-ribbonized segment 52B to precisely position proximal ends 54A, 54B of the hard coated optical fibers 50A, 50B in an abutting relationship. Index matching oil, gel, and/or adhesive may be provided between fiber ends (e.g., end faces) 54A, 54B, as known in the mechanical splicing art. In some embodiments, index matching material may be provided as a layer of cured polymer prearranged on proximal ends 54A, 54B of optical fibers of one fiber array 50A or 50B. In some embodiments, adhesive material may be further provided between the pluralities of optical fibers 50A, 50B and the rigid sleeve 60, 68 to promote retention of the first proximal non-ribbonized segment 52A and the second proximate non-ribbonized segment 52B FIG. 4B is an elevational view of the second proximal non-ribbonized segment 52B of second plurality of optical fibers 50B received within the rectangular bore 49 of the assembled sleeve 60, 68 of FIG. 4A. As shown, the chamfered end 67A of the second body structure 68, as well as chamfered end 65A and chamfered sidewall ends 65A' of the first body structure 60, are positioned adjacent to the rectangular bore 49. The bore 49 is bounded by the bottom surface 69 of the second body structure 68 as well as the bottom wall 63 and side walls 63' of the first body structure 60. End faces 54B of twelve optical fibers of the second proximal non-ribbonized segment 52B are shown, with each optical fiber including an external hard polymer coating 46-1B to 46-12B that is highly concentric relative to a core 42-1B to 42-12B thereof, and with the hard polymer coatings 46-1B to 46-12B being in contact with one another and with surfaces (of first and second body structure 60, 68) bounding the rectangular bore 49. In some embodiments, adhesive material may be received in the bore 49 in contact with the hard polymer coatings 46-1B to 46-12B.

Figure 4C:
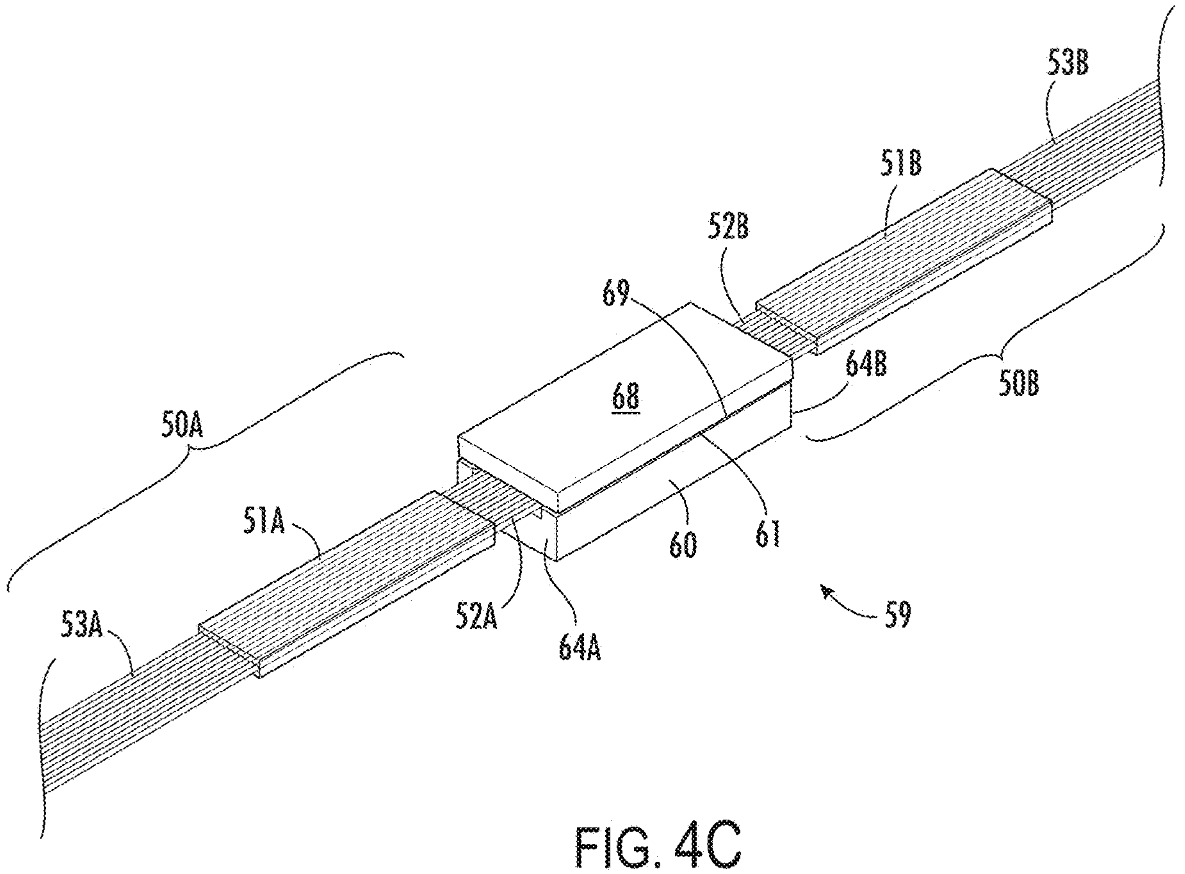
FIG. 4C is a perspective view of the multi-fiber mechanical splicing apparatus of FIG. 4A in assembled form to form a fiber optic cable assembly, with non-ribbonized segments of the first and second pluralities of hard polymer coated optical fibers received in the bore of the two-part rigid sleeve, to form a fiber optic cable assembly.

FIG. 4C is a perspective view of the multi-fiber mechanical splicing apparatus of FIG. 4A in assembled form to form a fiber optic cable assembly 59, with the first and second proximal non-ribbonized segments 52A, 52B received within the bore (49 in FIG. 4B) defined by the rigid sleeve 60, 68 with the lower surface 69 of the second body structure 68 contacting the upper surface 61 of the first body structure 60. As shown, the first plurality of optical fibers 50A extends outward from the first end 64 of the first body structure 60 (with the first ribbonized segment 51A, the first distal non-ribbonized segment 53A, the second ribbonized segment 51B, and the second distal non-ribbonized segment 53B all arranged outside the rigid sleeve 60, 68). As noted previously, index matching material (e.g., oil or adhesive) may be provided between abutting proximal ends (54A, 54B in FIG. 4A) of optical fibers of the first and second proximal non-ribbonized segments 52A, 52B, and adhesive material may be provided to retain the second body structure 68 to the first body structure 60, and to retain the first and second proximal non-ribbonized segments 52A, 52B received within the rectangular bore (49 in FIG. 4B) of the rigid sleeve 60, 68.

Although FIGS. 4A-4C show hard polymer coated optical fibers arranged in one-dimensional arrays, various embodiments are directed to mechanical splicing of two-dimensional arrays of hard polymer coated optical fibers using rigid sleeves, with each array of optical fibers including a ribbonized segment, optionally wherein a ribbonized segment (or another segment) of arrayed optical fibers includes a keying feature to identify a polarity and mating configuration of an optical fiber array, which may be useful when the optical fibers to be mechanically spliced are not identified by color or other distinguishing features.

Figure 5:
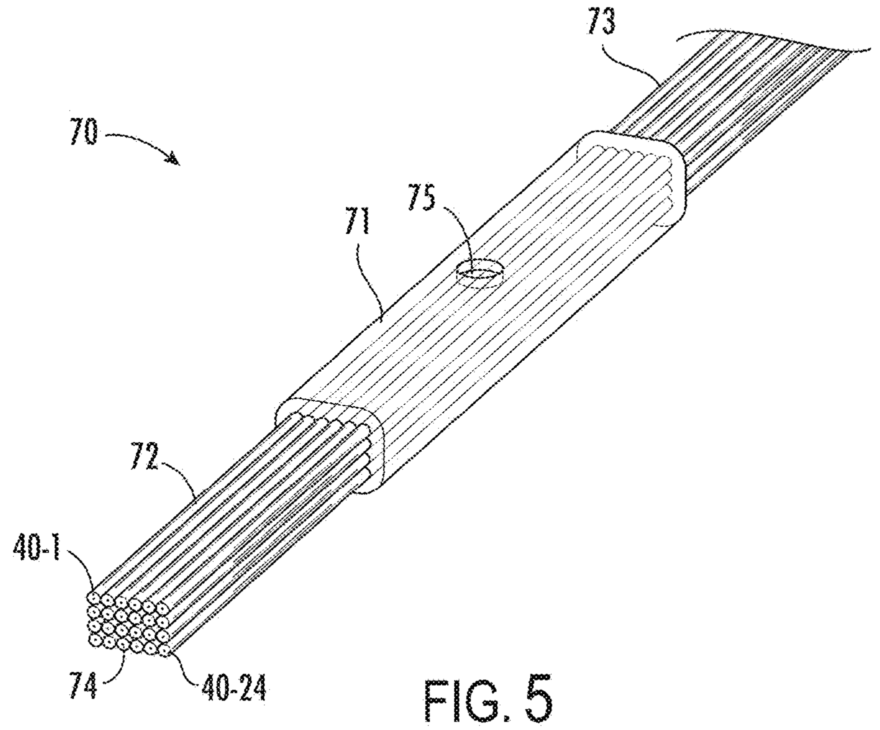
FIG. 5 is a perspective view of a two-dimensional (4×6) array of hard polymer coated optical fibers, including a ribbonized segment and a proximal non-ribbonized segment including proximal ends of the optical fibers, with the ribbonized segment including a matrix material encasing the arrayed optical fibers and including a keying feature defined in the matrix material.

FIG. 5 is a perspective view of a two-dimensional (4×6) array 70 of hard polymer coated optical fibers 40-1 to 40-24, including a ribbonized segment 71, a proximal non-ribbonized segment 72 including proximal ends 74 of the optical fibers 40-1 to 40-24, and a distal non-ribbonized segment 73. The ribbonized segment 71 includes a matrix material encasing the arrayed optical fibers 40-1 to 40-24 and defines a keying feature 75 optionally embodying a recess. Within the ribbonized segment 71, adjacent optical fibers of the arrayed optical fibers 40-1 to 40-24 are arranged in lateral contact with one another. Each hard coated optical fiber 40-1 to 40-24 includes a glass optical fiber and a hard polymer coating surrounding the glass optical fiber, the glass optical fiber comprising a fiber core and a cladding surrounding the fiber core. In some embodiments, the hard polymer coating for each optical fiber has a thickness between 0.1 μm and 10 μm, a Shore D hardness greater than 60, and a concentricity relative to the fiber core ranging between 0.1 μm and 0.5 μm (or any other combination of hard polymer coating thickness, Shore D hardness, and concentricity values or ranges identified herein).

In certain embodiments, end faces of arrayed optical fibers can each have a surface normal vector that is parallel to a fiber longitudinal axis, or (for applications requiring high return loss), the end face of each optical fiber can have a surface normal vector that is non-parallel to the optical fiber longitudinal axis. In the latter case, for example, each optical fiber can have a surface normal vector that differs from the optical fiber longitudinal axis by a value in an angular range of 1 degree to 8 degrees, or another desirable angular range. Keying features for optical fiber arrays may be arranged to be mated in a key-up to key-up configuration, or arranged to be mated in a key-up to key-down configuration.

Figure 6:
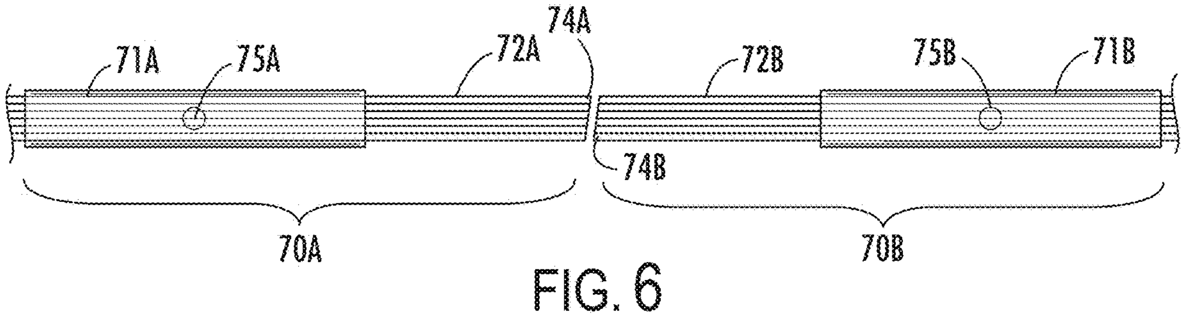
FIG. 6 is a top plan view of first and second two-dimensional arrays of hard polymer coated optical fibers, each including a ribbonized segment (with a keying feature defined in matrix material signifying surface normal vector orientation) and a non-ribbonized segment, with proximal ends of the arrays abutting one another, and with end faces of the optical fibers being angled with a surface normal vector that is non-parallel to the optical fiber longitudinal axis to provide high return loss, with the array exhibiting fiber length variation in a horizontal direction, and with keying features of the fiber arrays being aligned.

FIG. 6 is a top plan view of first and second two-dimensional arrays 70A, 70B of hard polymer coated optical fibers, each array 70A, 70B including a ribbonized segment 71A, 71B (with a keying feature 75A, 75B defined therein) and a proximal non-ribbonized segment 72A, 72B, with proximal end faces 74A, 74B of the arrayed optical fibers abutting one another. The proximal end faces 74A, 74B are angled with a surface normal vector that is non-parallel to the optical fiber longitudinal axis (e.g., having a difference in a range of 1 degree to 8 degrees, or another angular range) to provide high return loss, with the arrays 70A, 70B exhibiting fiber length variation in a horizontal direction (e.g., with leftmost optical fibers of each optical fiber array 70A, 70B being longer than rightmost optical fibers thereof). As shown, the keying features 75A, 75B of the fiber arrays 70A. 70B are arranged to be mated in a key-up to key-up configuration.

Figure 7:
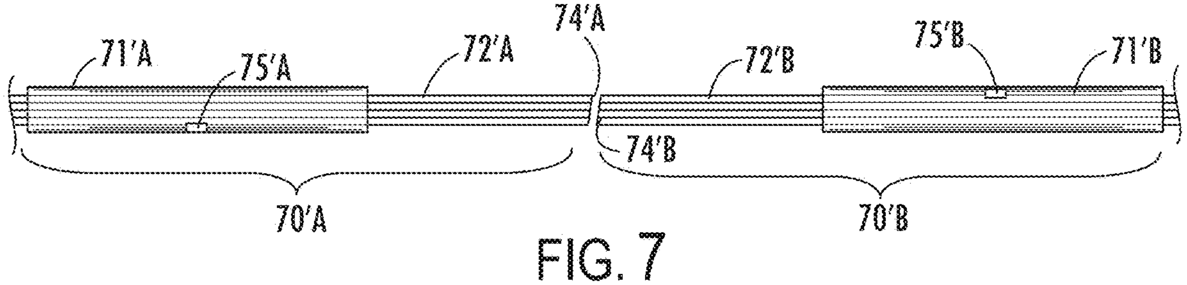
FIG. 7 is a side elevational view of first and second two-dimensional arrays of hard polymer coated optical fibers, each including a ribbonized segment (with a keying feature defined in matrix material signifying surface normal vector orientation) and a non-ribbonized segment, with proximal ends of the arrays abutting one another, with end faces of the optical fibers being angled with a surface normal vector that is non-parallel to the optical fiber longitudinal axis to provide high return loss, with the array exhibiting fiber length variation in a vertical direction, and with keying features of the fiber arrays being oppositely aligned.

FIG. 7 is a top plan view of first and second two-dimensional arrays 70'A, 70'B of hard polymer coated optical fibers, each array 70'A, 70'B including a ribbonized segment 71'A, 71'B (with a keying feature 75'A, 75'B defined therein) and a proximal non-ribbonized segment 72'A, 72'B, with proximal end faces 74'A, 74'B of the arrayed optical fibers abutting one another. The proximal end faces 74'A, 74'B are angled with a surface normal vector that is non-parallel to the optical fiber longitudinal axis (e.g., having a difference in a range of 1 degree to 8 degrees, or another angular range) to provide high return loss, with the arrays 70'A, 70'B exhibiting fiber length variation in a vertical direction (e.g., with uppermost optical fibers of each optical fiber array 70'A, 70'B being longer than lowermost optical fibers thereof). As shown, the keying features 75'A, 75'B of the fiber arrays 70'A. 70'B are arranged to be mated in a key-up to key-down configuration.

Figure 8A:
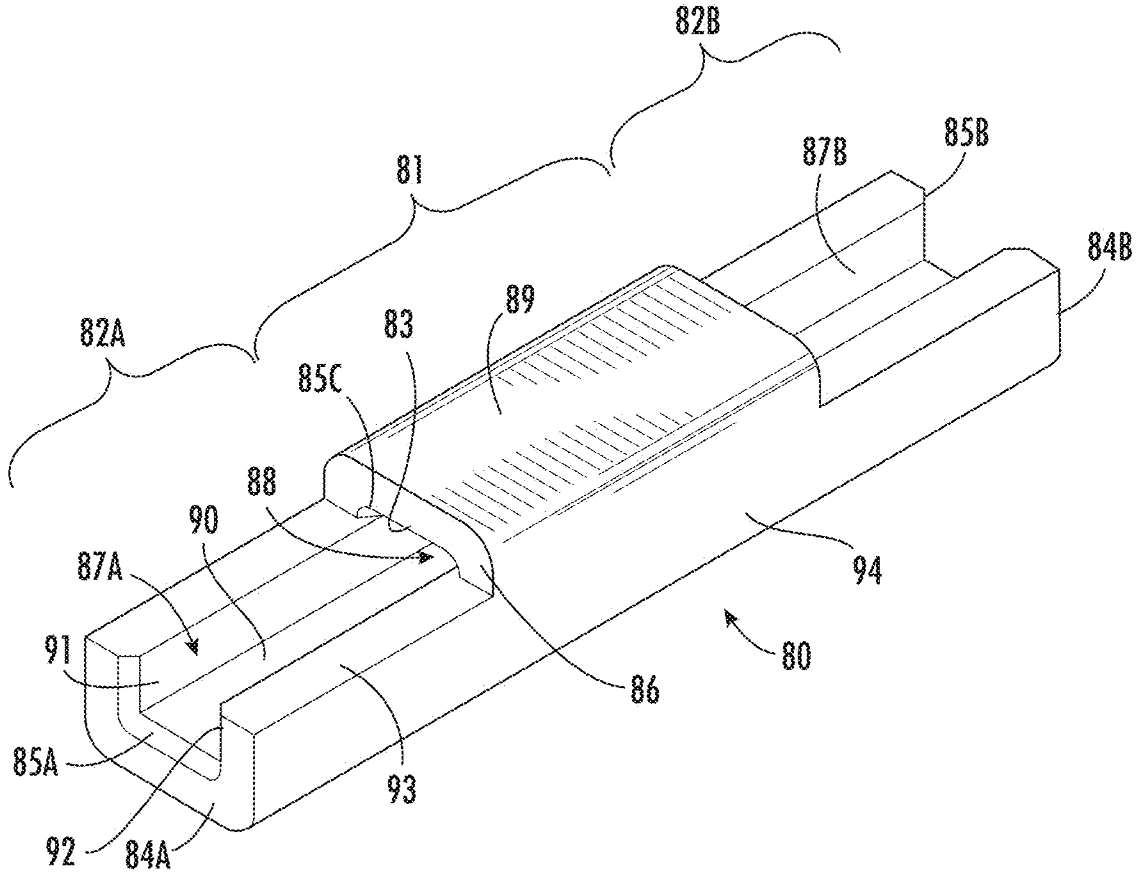
FIG. 8A is a perspective view of a rigid sleeve for mechanically splicing arrays of hard polymer coated optical fibers according to one embodiment of the present disclosure, including a unitary body structure with a medial portion arranged between first and second extension portions, the medial portion defining a bore having a rectangular cross-section, the extension portions each having a substantially U-shaped cross-section and extending continuously from the medial portion, with the medial portion and the extension portions being devoid of fiber alignment grooves.
Figure 8B:
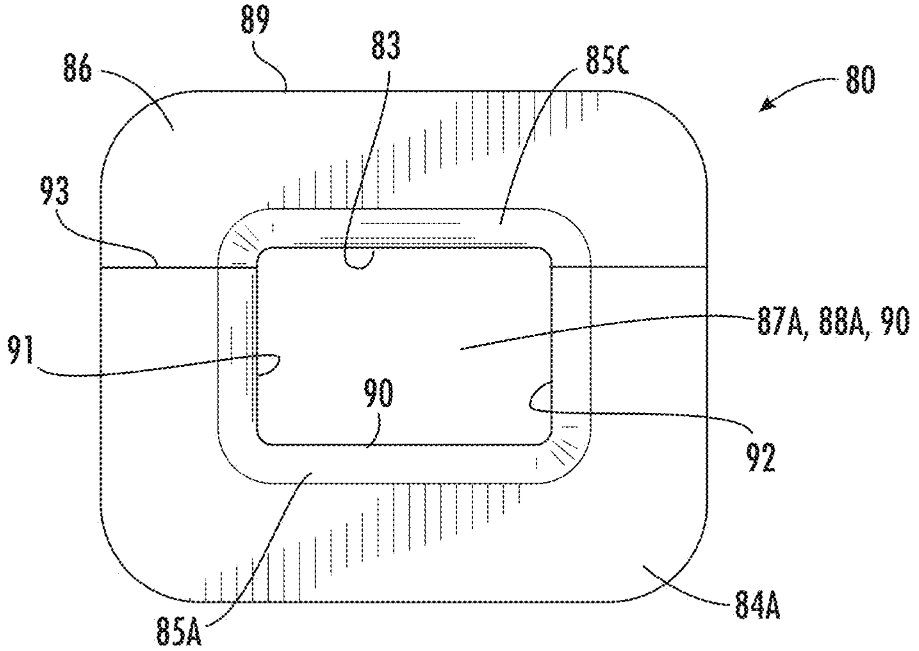
FIG. 8B is an end elevational view of the rigid sleeve of FIG. 8A.

FIG. 8A is a perspective view, and FIG. 8B is an end elevational view, of a rigid sleeve 80 for mechanically splicing arrays of hard polymer coated optical fibers according to some embodiments of the present disclosure. The rigid sleeve 80 has unitary body structure 94 with a medial portion 81 arranged between first and second extension portions 82A, 82B that terminate at first and second ends 84A, 84B, respectively. As shown, the medial portion 81 has a length that is greater than an individual length of each extension portion 82A, 82B. The medial portion 81 defines a bore 88 having a rectangular cross-section, with the extension portions 82A, 82B forming channels 87A, 87B that each have a substantially U-shaped cross-section with an upper boundary surface 93, and that extend continuously from the medial portion 81. The bore 88 and the channels 87A, 87B are bounded by a continuous bottom wall 90 and continuous sidewalls 91, 92, with the bore 88 also being bounded from above by a top wall 83 also forms a top surface 89 of the sleeve 80. Chamfered edges 85A, 85B are provided along the first and second ends 84A at transitions to the bottom wall 90 and sidewalls 91, 92. Additional chamfered edge(s) 85C along the top wall 83 at medial portion end faces 86 arranged at a transition between the U-shaped channels 87A, 87B and the rectangular bore 88. As shown, the bore 88 of the medial portion 81 and the channels 87A, 87B of the extension portions 82A, 82B are devoid of fiber alignment grooves. The rigid sleeve 80 may be fabricated of any suitably rigid material (e.g., composites, fiber-reinforced polymeric material, glass, ceramic, and/or metal) by a suitable process such as molding, sintering, machining, etc.

Figure 9A:
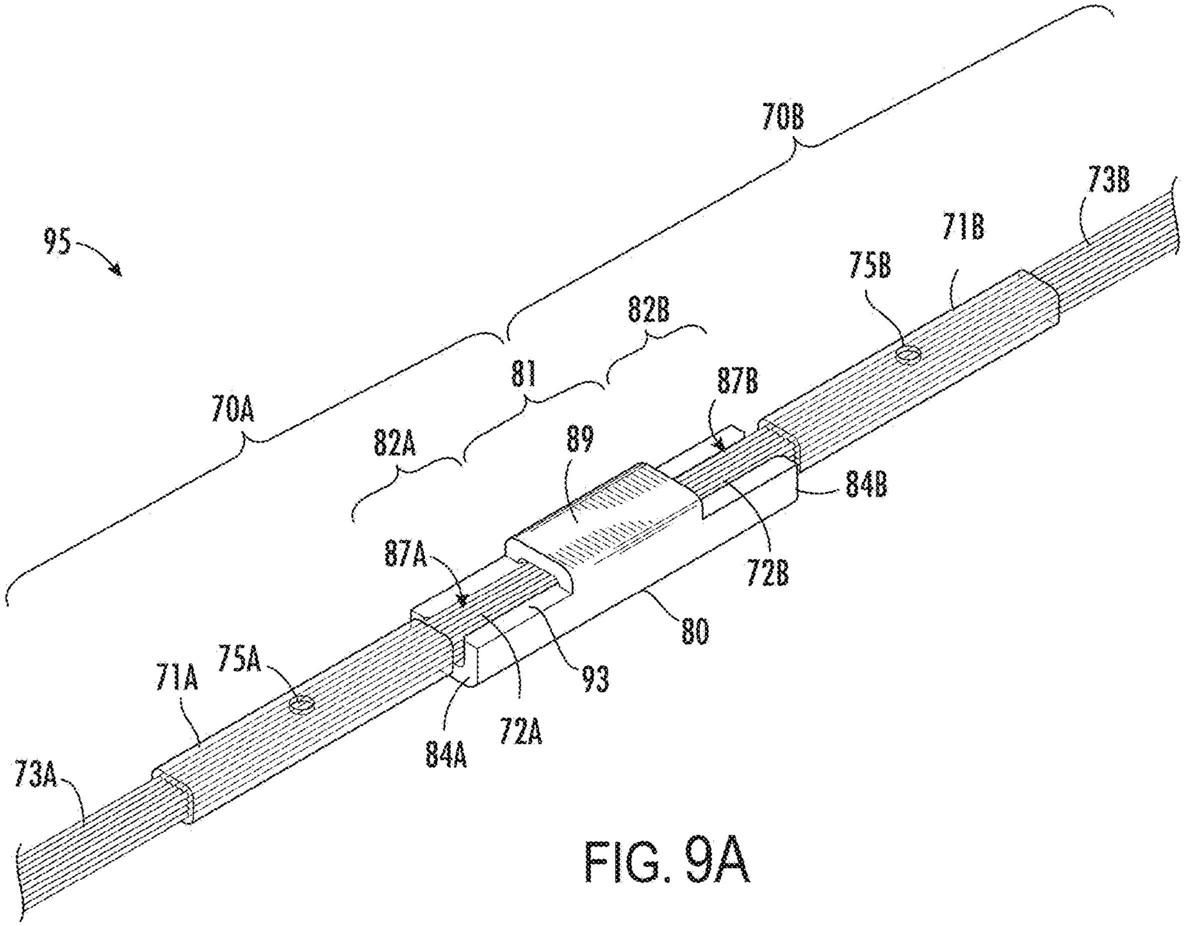
FIG. 9A is a perspective view of a multi-fiber mechanical splicing apparatus according to one embodiment of the present disclosure including the rigid sleeve of FIGS. 8A-8B in which abutting ends of non-ribbonized segments of first and second arrays of hard polymer coated optical fibers are received in an aligned relationship with adjacent optical fibers laterally contacting one another to form a fiber optic cable assembly.

FIG. 9A is a perspective view of a cable assembly 95 utilizing the rigid sleeve 80 of FIGS. 8A-8B as a mechanical splicing apparatus for splicing first and second two-dimensional arrays 70A, 70B of hard polymer coated optical fibers according to an embodiment. Each array 70A, 70B includes a ribbonized segment 71A, 71B (with a keying feature 75A, 75B defined therein), a distal non-ribbonized segment 73A, 73B, and a proximal non-ribbonized segment 72A, 72B, wherein the proximal non-ribbonized segments 72A, 72B are received by U-shaped channels 87A, 87B and the rectangular bore (88 in FIGS. 8A, 8B) of the sleeve 80. In particular, a first distal non-ribbonized segment 72A of the first optical fiber array 70A extends through a first U-shaped channel 87A (defined by first extension portion 82A) and into the rectangular bore (defined by the medial portion 81) with proximal end faces of its arrayed optical fibers abutting proximal end faces of arrayed optical fibers of the second optical fiber array 70B, for which a second distal non-ribbonized segment 72B extends through a second U-shaped channel 87B (defined by the second extension portion 82B) and into the rectangular bore.

Figure 9B:
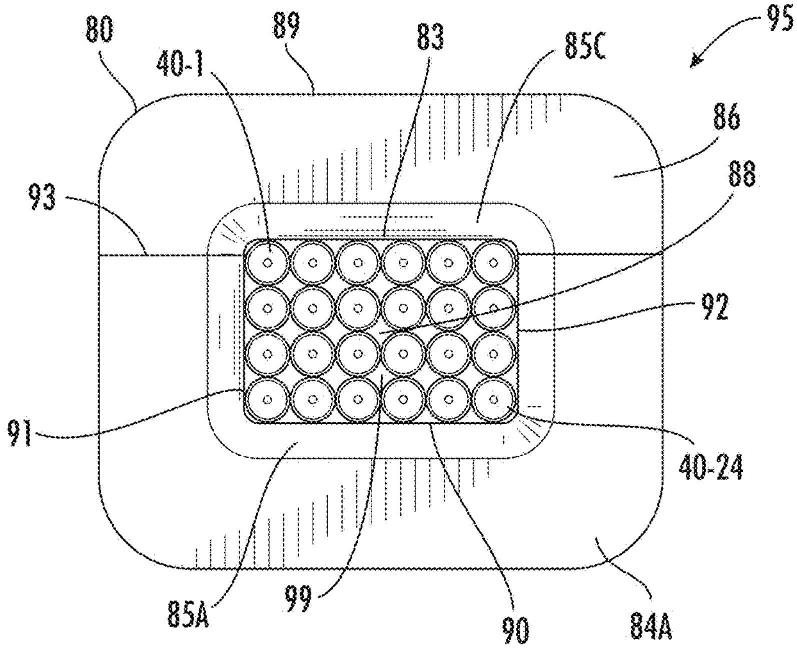
FIG. 9B is an elevation view of one of the second array of optical fibers received within a rectangular bore of the rigid sleeve of the multi-fiber mechanical splicing apparatus of FIG. 4A.

FIG. 9B is an elevational view of the second array 70B (shown in FIG. 9A) of hard polymer coated optical fibers received within the rectangular bore 88 of the rigid sleeve 80 of FIG. 9A. As shown, the array includes twenty-four hard polymer coated optical fibers 40-1 to 40-24, with each optical fiber 40-1 to 40-24 laterally contacting other adjacent optical fibers 40-1 to 40-24, and with outermost optical fibers 40-1 to 40-24 also contacting walls 90-92, 83 defining the rectangular bore 88. Optionally, adhesive material 99 may be arranged within the bore 88 to bind the optical fibers 40-1 to 40-24 to the sleeve 80, and/or to serve as index matching material between optical fiber end faces to be mechanically spliced. As shown in FIG. 9B, chamfered edges 85A, 85C are arranged on end-facing surfaces of the sleeve 80 to serve as lead-in features to ease insertion of optical fibers into the bore 88.

In use, the first proximal non-ribbonized segment 72A is inserted (e.g., downwardly and forwardly) into the first U-shaped channel 87A and slid forwardly into the rectangular bore 99, and the second non-ribbonized segment 72B is similarly inserted into the second U-shaped channel 8BA and slid into the rectangular bore 99. The open-topped U-shaped channels 87A, 87B serve a desirable function of permitting easy insertion (in a downward and forward direction) and thereafter guiding forward travel of the non-ribbonized segments into the bore of the medial section 89.

Although FIG. 9B shows a 4×6 array of optical fibers received within the rectangular bore 88 of the rigid sleeve 80, it is to be recognized that similar rigid sleeves may be designed to receive and protect different numbers of mechanically spliced fibers. For example, rigid sleeves may be configured to receive optical fiber arrays of 8×8, 12×12, 6×16, or any suitable configurations of hard polymer coated optical fibers.

In certain embodiments, a multi-fiber micro cable may include arrayed hard polymer coated optical fibers with a pre-cleaved, pre-ribbonized segment and a proximal non-ribbonized segment for installation in a microduct. Such a cable may include a cable jacket surrounding the arrayed optical fibers.

Figure 10A:
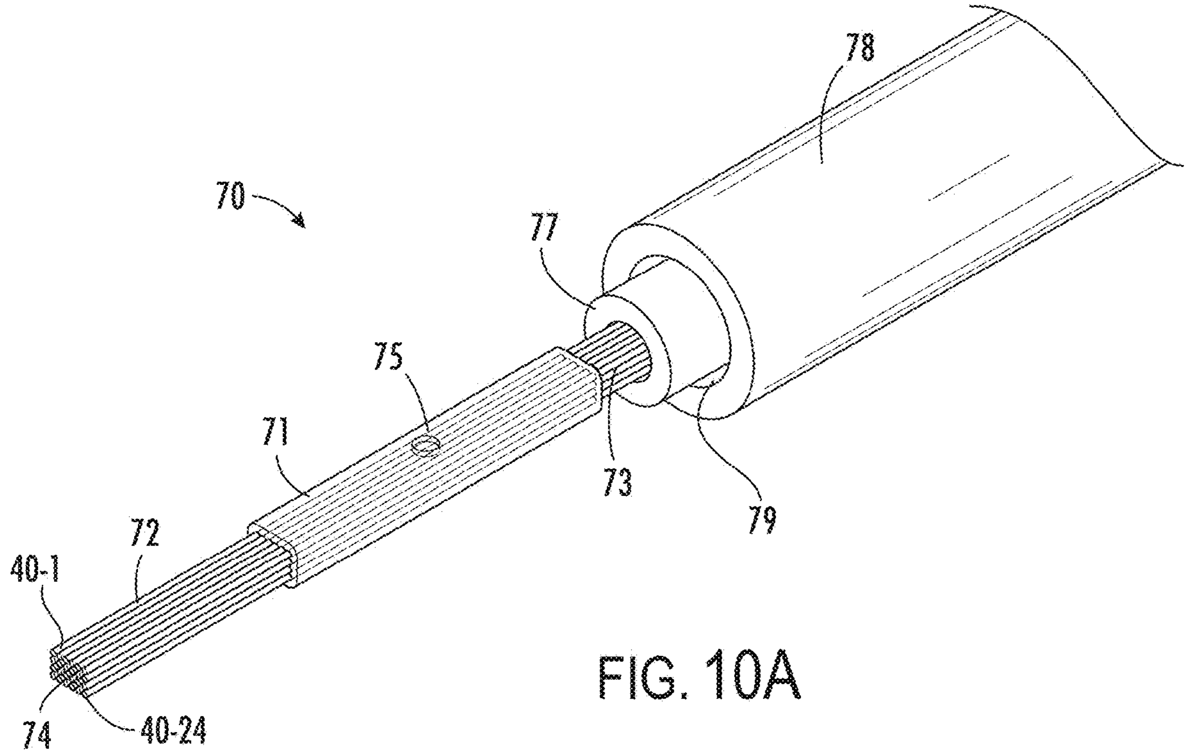
FIG. 10A is a perspective view of a jacketed optical fiber micro cable within a microduct, the optical fiber micro cable including a jacket surrounding a non-ribbonized distal segment of a two-dimensional (4×6) array of hard polymer coated optical fibers, a ribbonized segment defining a keying feature, and a non-ribbonized proximal segment incorporating proximal ends of the optical fibers.
Figure 10B:
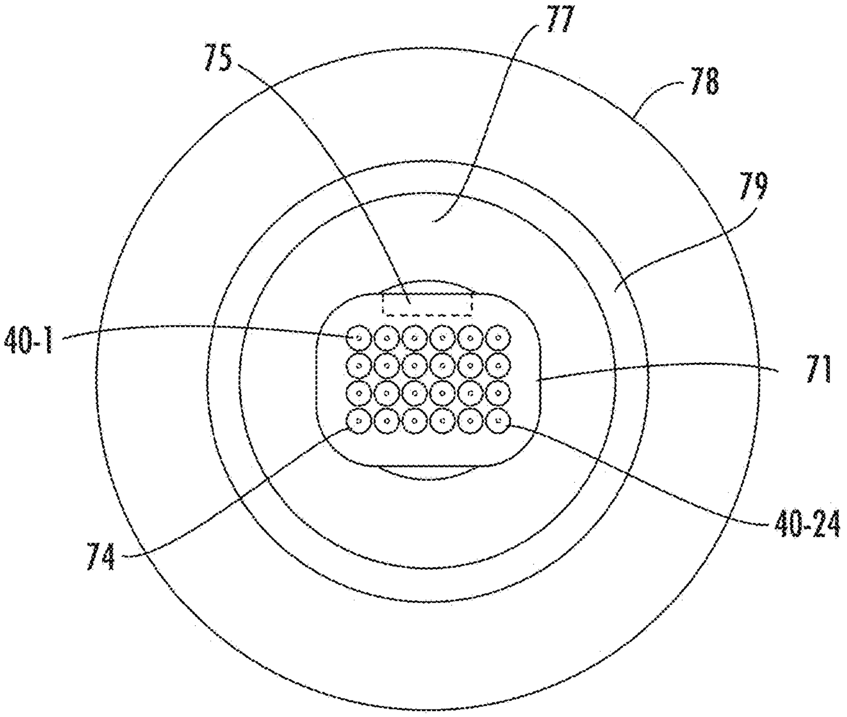
FIG. 10B is an end elevational view of the jacketed optical fiber micro cable and the microduct of FIG. 10A.

FIG. 10A provides a perspective view of an optical fiber array 70 (with optical fibers 40-1 to 40-24 arranged in a 4×6 array) including a pre-ribbonized segment 71 (defining keying feature 75) arranged between a proximal non-ribbonized segment 72 and distal non-ribbonized segment 73, with the optical fibers 70 protruding from a cable jacket 77, and with the cable jacket 77 received in a circular bore 79 of a microduct 78. In certain embodiments, the jacket 77 may be stripped from optical fibers 40-1 to 40-24, and ribbon matrix material may be formed around the optical fibers 40-1 to 40-24, to form the pre-ribbonized segment 71 and proximal non-ribbonized segment 72 emanating from the jacket 77, to form a pre-terminated assembly suitable for blowing through the microduct 78 in preparation for mechanical splicing (e.g., in a field environment) using a rigid sleeve such as disclosed herein (e.g., sleeve 80 in FIGS. 8A to 8B). FIG. 10B is an end elevational view of the optical fiber micro cable 70 and microduct 78 of FIG. 10A. As shown, the height and width dimensions of the ribbonized segment 71 is smaller than a diameter of the jacket 77, such that the ribbonized segment will pass easily through the circular bore 79 of the microduct 78. In certain embodiments, a maximum width of the ribbonized segment is no more than 1 mm greater than an aggregate width of the arrayed hard polymer optical fibers 40-1 to 40-24. In certain embodiments, the microduct 78 has a 3 mm outer diameter and the bore 79 has a 2 mm inner diameter, and the cable jacket 77 has an outer diameter of 1.6 mm. Higher fiber count micro cables can be similarly provided. For example, a micro cable may include 64 optical fibers arranged in an 8×8 array, and pass readily through a microduct having a 3.5 mm inner diameter and a 5 mm outer diameter.

In certain embodiments, first and second cable segments each having a jacket surrounding multiple hard polymer coated optical fibers may be mechanically spliced (using a rigid sleeve as disclosed herein) following removal of a first cable jacket from a portion of the first cable segment, and removing the second cable jacket from a portion of the second cable segment.

In certain embodiments, hard polymer coated optical fibers as disclosed herein may initially include a peripheral coating layer (e.g., of a relatively soft polymer or other material), and the peripheral coating layer may be removed, by stripping means known in the art (e.g., thermal, chemical, and/or mechanical stripping), to yield optical fibers having exposed hard polymer coating layers along outer surfaces thereof, in preparation for ribbonizing arrayed segments thereof and preparing arrayed non-ribbonized proximal segments for mechanical splicing using a rigid sleeve as disclosed herein.

Figure 11:
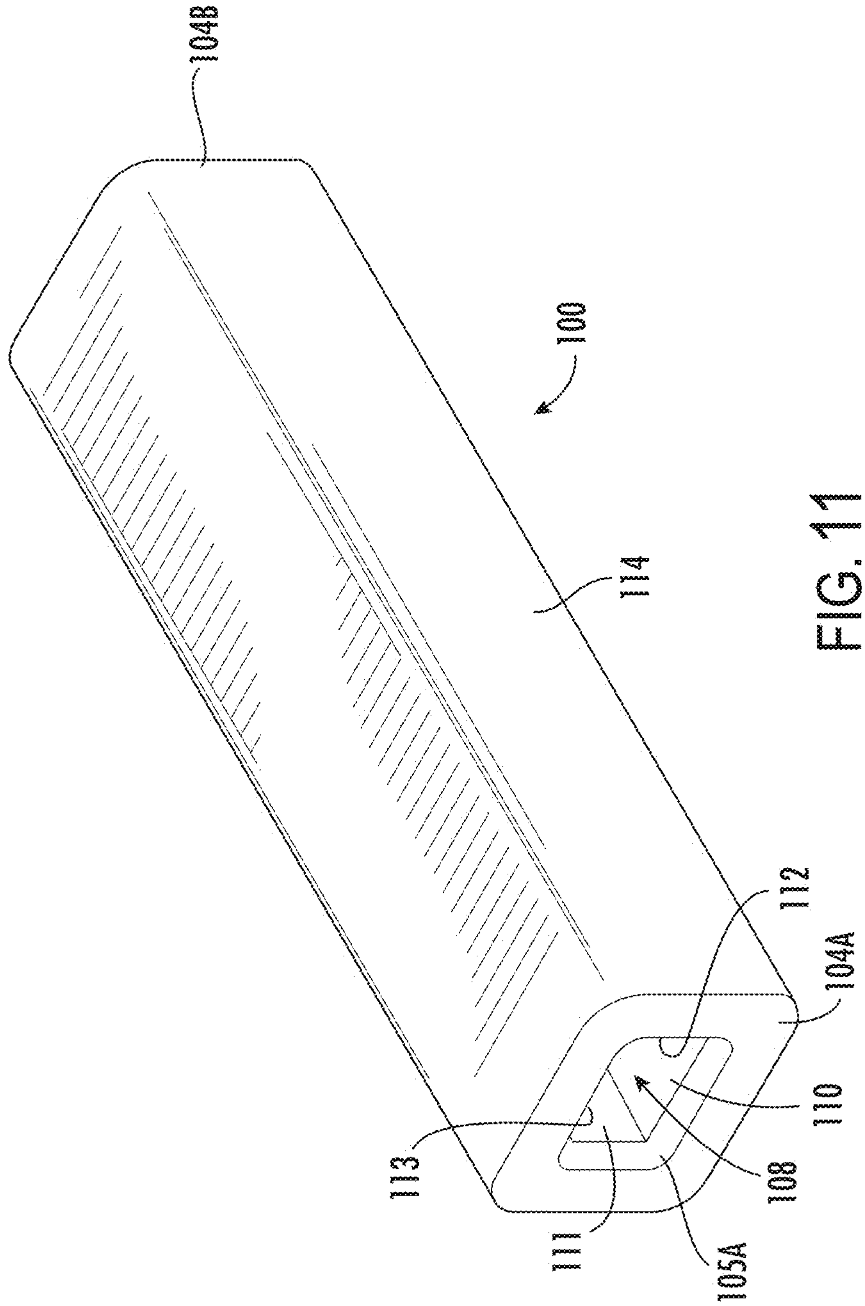
FIG. 11 is a perspective view of a rigid sleeve for splicing arrays of hard polymer coated optical fibers according to one embodiment of the present disclosure, including a unitary body structure defining a bore having a rectangular cross-section, and walls of the bore being devoid of fiber alignment grooves.

In certain embodiments, a rigid sleeve suitable for mechanical splicing of arrayed hard polymer coated optical fibers may lack extension portions, and instead include only a body defining a rectangular bore. An example of such a sleeve 100 is shown in FIG. 11. The sleeve 100 includes a unitary body structure 114 having a rectangular bore 108 (bounded by walls 110-114) extending between first and second ends 104A, 104B. Chamfered edges 105A may be provided at a transition between each end 104A, 104B and the bore 108. The sleeve 100 (including walls 110-114) is devoid of fiber alignment grooves. In use of the sleeve 100, a first array of hard polymer coated optical fibers may be inserted from the first end 104A into the bore 110, and a second array of hard polymer coated optical fibers may be inserted from the second end 104B into the bore 110, to cause aligned proximal ends of such arrays to abut one another to permit mechanical splicing (optionally in conjunction with index matching material and/or adhesive).

It will be apparent to those skilled in the art that various modifications and variations can be made without departing from the spirit or scope of the invention.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A fiber optic cable assembly comprising:

a first plurality of optical fibers and a second plurality of optical fibers; and a rigid sleeve defining a bore having a rectangular cross section;

wherein:

optical fibers of each of the first plurality of optical fibers and the second plurality of optical fibers includes a glass optical fiber and a hard polymer coating surrounding the glass optical fiber, the glass optical fiber comprises a fiber core and a cladding surrounding the fiber core, with the hard polymer coating having a thickness between 0.1 μm and 10 μm, a Shore D hardness greater than 60, and a concentricity relative to the fiber core ranging between 0.1 μm and 0.5 μm;

the first plurality of optical fibers comprises a first ribbonized segment and first non-ribbonized segment, with the first non-ribbonized segment including proximal ends of optical fibers of the first plurality of optical fibers, the second plurality of optical fibers comprises a second ribbonized segment and at least one second non-ribbonized segment, with the second ribbonized segment including proximal ends of optical fibers of the second plurality of optical fibers; and the bore of the rigid sleeve is configured to receive the first non-ribbonized segment and the second non-ribbonized segment with proximal ends of the first plurality of optical fibers abutting proximal ends of the second plurality of optical fibers within the bore, the bore being bounded by walls that are devoid of fiber alignment grooves, the walls being configured to contact (i) the hard polymer coating of at least some optical fibers of the first plurality of optical fibers and (ii) the hard polymer coating of at least some optical fibers of the second plurality of optical fibers, and the bore being dimensioned to promote a misalignment tolerance of less than 1 μm between fiber cores at abutting proximal ends of the first and second pluralities of optical fibers.

2. The fiber optic cable assembly of claim 1, wherein the first plurality of optical fibers is arranged in a first two-dimensional array, and the second plurality of optical fibers is arranged in a second two-dimensional array.

3. The fiber optic cable assembly of claim 1, further comprising index matching material within the bore at proximal ends of the first and second pluralities of optical fibers, and adhesive material arranged to adhere (i) portions of the first non-ribbonized segment to the rigid sleeve, and (ii) portions of the second non-ribbonized segment to the rigid sleeve.

4. The fiber optic cable assembly of claim 1, wherein the rigid sleeve comprises a first body structure defining a channel bounded by first to third sleeve walls, and the rigid sleeve comprises a second body structure configured to mate with the first body structure and defining a cover forming a fourth sleeve wall, wherein the first to fourth sleeve walls in combination bound the bore of the rigid sleeve.

5. The fiber optic cable assembly of claim 1, wherein the rigid sleeve comprises a unitary body structure.

6. The fiber optic cable assembly of claim 5, wherein:

the unitary body structure comprises a medial portion arranged between first and second extension portions;

the medial portion defines the bore, the walls bounding the bore including a bottom wall, a top wall, and two opposing side walls;

each of the first extension portion and the second extension portion defines a generally U-shaped channel, the channel being bounded by a bottom wall and two opposing side walls;

the bottom wall of the medial portion extends continuously from the bottom wall of the first extension portion to the bottom wall of the second extension portion, and the side walls of the medial portion extend continuously from the side walls of the first extension portion to the side walls of the second extension portion, to form a continuous passage between the bore and the channel defined in the first and second extension portions; and each bottom wall, each side wall, and the top wall is devoid of fiber alignment grooves.

7. The fiber optic cable assembly of claim 1, wherein:

each optical fiber of the first plurality of optical fibers comprises a first longitudinal axis and an end face having a first surface normal vector that is non-parallel to the first longitudinal axis; and each optical fiber of the second plurality of optical fibers comprises a second longitudinal axis and an end face having a second surface normal vector that is non-parallel to the second longitudinal axis.

8. The fiber optic cable assembly of claim 7, wherein the first surface normal vector differs from the first longitudinal axis by an angle within a range of 1 to 8 degrees, and the second surface normal vector differs from the second longitudinal axis by an angle within a range of 1 to 8 degrees.

9. The fiber optic cable assembly of claim 7, wherein the first ribbonized segment comprises a first keying feature signifying orientation of the first surface normal vector, and the second ribbonized segment comprises a second keying feature signifying orientation of the second surface normal vector.

10. The fiber optic cable assembly of claim 1, wherein:

the first unribbonized segment has a length of at least 2 millimeters, with proximal ends of the optical fibers of the first plurality of optical fibers exhibiting end face coplanarity within a range of +/−10 μm; and the second unribbonized segment has a length of at least 2 millimeters, with proximal ends of the optical fibers of the second plurality of optical fibers exhibiting end face coplanarity within a range of +/−10 μm.

11. The fiber optic cable assembly of claim 1, wherein:

for each optical fiber of the first plurality of optical fibers, the proximal end comprises a cleaved end face; and for each optical fiber of the second plurality of optical fibers, the proximal end comprises a cleaved end face.

12. A method for splicing optical fibers, the method comprising:

providing a first plurality of optical fibers and a second plurality of optical fibers, wherein optical fibers of each of the first plurality of optical fibers and the second plurality of optical fibers includes a glass optical fiber and a hard polymer coating surrounding the glass optical fiber, the glass optical fiber comprises a fiber core and a cladding surrounding the fiber core, with the hard polymer coating having a thickness between 0.1 μm and 10 μm, a Shore D hardness greater than 60, and a concentricity relative to the fiber core ranging between 0.1 μm and 0.5 μm;

ribbonizing a section of the first plurality of optical fibers to provide a first ribbonized segment, wherein the first plurality of optical fibers further comprises a non-ribbonized segment including proximal ends of the first plurality of optical fibers;

ribbonizing a section of the second plurality of optical fibers to provide a second ribbonized segment, wherein the second plurality of optical fibers further comprises a non-ribbonized segment including proximal ends of the second plurality of optical fibers; and receiving the first non-ribbonized segment and the second non-ribbonized segment in a bore of a rigid sleeve with proximal ends of the first plurality of optical fibers abutting proximal ends of the second plurality of optical fibers, the bore having a rectangular cross-section and being bounded by walls that are devoid of fiber alignment grooves, with the walls contacting (i) the hard polymer coating of at least some optical fibers of the first plurality of optical fibers and (ii) the hard polymer coating of at least some optical fibers of the second plurality of optical fibers, and the bore being dimensioned to provide an alignment tolerance of less than 1 μm between fiber cores at abutting proximal ends of the first and second pluralities of optical fibers.

13. The method of claim 12, further comprising providing adhesive material to adhere (i) portions of the first non-ribbonized segment to the rigid sleeve, and (ii) portions of the second non-ribbonized segment to the rigid sleeve.

14. The method of claim 12, further comprising providing index matching material within the bore at proximal ends of the first and second pluralities of optical fibers.

15. The method of claim 12, wherein the first plurality of optical fibers is arranged in a first two-dimensional array, and the second plurality of optical fibers is arranged in a second two-dimensional array.

16. The method of claim 12, wherein the rigid sleeve comprises a unitary body structure.

17. The method of claim 16, wherein:

the unitary body structure comprises a medial portion arranged between first and second extension portions the medial portion defines the bore, the walls bounding the bore including a bottom wall, a top wall, and two opposing side walls;

each of the first extension portion and the second extension portion defines a generally U-shaped channel, the channel being bounded by a bottom wall and two opposing side walls;

the bottom wall of the medial portion extends continuously from the bottom wall of the first extension portion to the bottom wall of the second extension portion, and the side walls of the medial portion extend continuously from the side walls of the first extension portion to the side walls of the second extension portion, to form a continuous passage between the bore and the channel defined in the first and second extension portions;

each bottom wall, each side wall, and the top wall is devoid of fiber alignment grooves; and the method further comprises receiving the first non-ribbonized segment within the channel of the first extension portion, and receiving the second non-ribbonized segment within the channel of the second extension portion.

18. The method of claim 12, wherein the first plurality of optical fibers emanates from a first cable segment having a first cable jacket, the second plurality of optical fibers emanates from a second cable segment having a second cable jacket, and the method further comprises:

removing the first cable jacket from a portion of the first cable segment; and removing the second cable jacket from a portion of the second cable segment.

19. The method of claim 12, wherein optical fibers of the first plurality of optical fibers initially include at least one first peripheral coating layer, optical fibers of the second plurality of optical fibers initially include at least one second peripheral coating layer, and the method further comprises:

removing the at least one first peripheral coating layer from each optical fiber of the first plurality of optical fibers to expose the hard polymer coating for each optical fiber of the first plurality of optical fibers; and removing the at least one second peripheral coating layer from each optical fiber of the second plurality of optical fibers to expose the hard polymer coating for each optical fiber of the second plurality of optical fibers.

20. A rigid sleeve for splicing optical fibers of a fiber optic cable assembly, the rigid sleeve comprising a unitary body structure comprising a medial portion arranged between first and second extension portions, wherein:

the medial portion defines a bore having a rectangular cross-section, the walls bounding the bore being bounded by a plurality of walls including a bottom wall, a top wall, and two opposing side walls;

each of the first extension portion and the second extension portion defines a generally U-shaped channel, the channel being bounded by a bottom wall and two opposing side walls;

the bottom wall of the medial portion extends continuously from the bottom wall of the first extension portion to the bottom wall of the second extension portion, and the side walls of the medial portion extend continuously from the side walls of the first extension portion to the side walls of the second extension portion, to form a continuous passage between the bore and the channel defined in the first and second extension portions; and each bottom wall, each side wall, and the top wall is devoid of fiber alignment grooves.

21. The rigid sleeve of claim 20, wherein the first extension portion comprises a first end face, the second extension portion comprises a second end face, the bottom wall and two opposing side walls of the first extension portion are chamfered along the first end face, and the bottom wall and two opposing side walls of the second extension portion are chamfered along the second end face.

22. The rigid sleeve of claim 20, wherein the medial portion comprises a first medial portion end face proximate to the first extension portion, the medial portion comprises a second medial portion proximate to the second extension portion, the top wall of the medial portion is chamfered along the first medial portion end face, and the top wall of the medial portion is chamfered along the second medial portion end face.

23. The rigid sleeve of claim 20, wherein a length of the medial portion is greater than a length of the first extension portion, and the length of the medial portion is greater than a length of the second extension portion.

24. The rigid sleeve of claim 20, wherein the unitary body structure comprises one or more of: composite material, fiber-reinforced polymeric material, glass, ceramic, and metal.

25. A fiber optic cable assembly comprising:

a sleeve according to claim 20;

a first plurality of optical fibers and a second plurality of optical fibers, wherein optical fibers of each of the first plurality of optical fibers and the second plurality of optical fibers includes a glass optical fiber and a hard polymer coating surrounding the glass optical fiber, the glass optical fiber comprises a fiber core and a cladding surrounding the fiber core, with the hard polymer coating having a thickness between 0.1 μm and 10 μm, a Shore D hardness greater than 60, and a concentricity relative to the fiber core ranging between 0.1 μm and 0.5 μm;

wherein the first plurality of optical fibers comprises a first ribbonized segment and first non-ribbonized segment, with the first non-ribbonized segment including proximal ends of the first plurality of optical fibers, wherein the second plurality of optical fibers comprises a second ribbonized segment and at least one second non-ribbonized segment, with the second ribbonized segment including proximal ends of the second plurality of optical fibers;

wherein the first non-ribbonized segment is received in the channel of the first extension portion, the second non-ribbonized segment is received in the channel of the second extension portion, proximal ends of the first plurality of optical fibers abut proximal ends of the second plurality of optical fibers within the bore, and the plurality of walls are configured to contact (i) the hard polymer coating of at least some optical fibers of the first plurality of optical fibers and (ii) the hard polymer coating of at least some optical fibers of the second plurality of optical fibers.

* * * * *